US008353971B2

(12) United States Patent
Yeh

(10) Patent No.: US 8,353,971 B2
(45) Date of Patent: Jan. 15, 2013

(54) FLEXIBLE ENVELOPE TYPE BATTERY AND ELECTRICALLY CONDUCTIBLE SEALING STRUCTURE THEREOF AND ASSEMBLING METHOD THEREOF

(75) Inventor: Sheng-Fa Yeh, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 1085 days.

(21) Appl. No.: 12/123,497

(22) Filed: May 20, 2008

(65) Prior Publication Data

US 2009/0169991 A1 Jul. 2, 2009

(30) Foreign Application Priority Data

Dec. 27, 2007 (TW) ................................ 96150632 A

(51) Int. Cl.
*H01M 2/08* (2006.01)
*H01M 2/02* (2006.01)
(52) U.S. Cl. ........................ 29/623.2; 429/181; 429/185
(58) Field of Classification Search ...... 29/623.1–623.5; 429/122–347
See application file for complete search history.

(56) References Cited

U.S. PATENT DOCUMENTS

| 5,419,982 A * | 5/1995 | Tura et al. ..................... 429/162 |
| 2004/0033416 A1* | 2/2004 | Kim et al. ..................... 429/175 |
| 2004/0161669 A1* | 8/2004 | Zolotnik et al. ............... 429/233 |

* cited by examiner

*Primary Examiner* — Basia Ridley
*Assistant Examiner* — Jonathan G Leong
(74) *Attorney, Agent, or Firm* — McClure, Qualey & Rodack, LLP

(57) ABSTRACT

A flexible-envelope type battery and an electrically conductible sealing structure thereof and an assembling method thereof are provided. The battery includes an electrode pair, a flexible envelope and a pair of electrically conductible sealing structures. Each sealing structure includes a conductive terminal and a fixed member. The conductive terminal includes a bottom board and a protruding block, for conducting an electric current from the electrode pair to the outside. The bottom board is disposed within the flexible envelope and combined with the electrode pair. The protruding block is disposed on the bottom board for passing through and protruding from an upper surface of the flexible envelope. The fixed member is for tightly fixing the flexible envelope and the conductive terminal.

8 Claims, 8 Drawing Sheets

US 8,353,971 B2

FLEXIBLE ENVELOPE TYPE BATTERY AND ELECTRICALLY CONDUCTIBLE SEALING STRUCTURE THEREOF AND ASSEMBLING METHOD THEREOF

This application claims the benefit of Taiwan application Serial No. 96150632, filed Dec. 27, 2007, the subject matter of which is incorporated herein by reference.

BACKGROUND OF THE INVENTION

1. Field of the Invention

The invention relates in general to a battery and an assembling method thereof, and more particularly to a flexible-envelope type battery and an electrically conductible sealing structure thereof and an assembling method of the flexible-envelope type battery.

2. Description of the Related Art

No matter whether the commodity is a popular small portable electronic product or a big vehicle, such as the motorcycle or car, a battery is indispensable. For most portable electronic products, the main electric power source is from the battery. So, how to reduce the manufacturing cost and provide a safe and useful battery to the consumers simultaneously is an important goal for the industry.

Referring to FIG. 1 and FIG. 2, FIG. 1 is a schematic diagram of a conventional flexible-envelope type battery, and FIG. 2 is a cross-sectional view at 2-2' line in FIG. 1. The conventional flexible-envelope battery 100 includes an electrode pair 110, a flexible envelope 120, a pair of internal conductive leads 130a and 130b, a pair of external conductive leads 140a and 140b, a pair of conductive rivets 150a and 150b and two pair of sealing parts 160a, 160b, 170a and 170b. The internal lead 130a, the external lead 140a, the conductive rivet 150a and the sealing parts 160a and 170a are disposed correspondingly to an anodic collecting electrode 111 of the electrode pair 110. Similarly, the internal lead 130b, the external lead 140b, the conductive rivet 150b and the sealing parts 160b and 170b are disposed correspondingly to an anodic collecting electrode 111' of the electrode pair 110.

In FIG. 2, the anodic collecting electrode 111 and cathodic collecting electrode 111' are combined with the internal lead 130a and 130b by welding or fusing. And, the conductive rivets 150a and 150b pass through the two holes 120h and 120h' of flexible envelope 120 for conducting electric currents from the anodic and the cathodic collecting electrodes 111 and 111' to the external leads 140a and 140b. The conductive rivets 150a and 150b are also used to fix the sealing parts 160a, 160b, 170a and 170b for sealing the two holes 120h and 120h' so as to prevent the electrolyte-leak occurred via the two holes 120h and 120h'.

In the conventional way of conducting the electric current to the outside, the conductive rivet is used for connecting the internal lead and the external lead, allowing the electric current to pass through. Thus, the passing of the electric current is limited by the cross-section area of the conductive rivet. In the conventional way of sealing the openings, the conductive rivet is subject to a constant pressure over a long period of time, so as to result in the stress corrosion. The conductive rivet accompanied a jointed seam is inevitable, and therefore a risk of the electrolyte-leak exists. Furthermore, the conventional flexible-envelope type battery 100 consisted of a lot of elements described above makes an assembling method thereof complicated, laborious and time-consuming. For example, solders and equipments for welding must be prepared for performing the conventional assembling method. Thus, the quality is difficult to be raised and the production cost is difficult to be reduced in the conventional way of producing the battery.

SUMMARY OF THE INVENTION

The invention is directed to a flexible-envelope type battery and an electrically conductible sealing structure thereof and an assembling method thereof. The electrically conductible sealing structure is for conducting an electric current from inside to outside, or vice versa, of the battery, and furthermore the electrically conductible sealing structure conducts the electric current in direct contact with the electrode pair. Therefore, a larger cross-section area for conducting the electric current over the conventional techniques can be provided. Moreover, the electrically conductible sealing structure is free of the rivets described above in the case of conducting the electric current. So, the stress corrosion and the jointed seam of a rivet close to the electrolyte and the electrode pair are inexistent, and the electrolyte-leak will be prevented.

According to a first aspect of the present invention, an electrically conductible sealing structure of a flexible-envelope type battery is provided. The battery comprises a flexible envelope and an electrode pair enveloped in the flexible envelope. The sealing structure comprises a conductive terminal and a fixed member. The conductive terminal comprises a bottom board and a protruding block. The bottom board is disposed within the flexible envelope and combined with the electrode pair. The protruding block is disposed on the bottom board for passing through and protruding from an upper surface of the flexible envelope. The fixed member is for tightly fixing the flexible envelope and the conductive terminal, and furthermore the fixed member comprises a clamp component. The clamp component has a first clamping portion, a second clamping portion and a bending portion. The bending portion connects the first clamping portion and the second clamping portion so that the first clamping portion is disposed around the protruding block and attached on the upper surface of the flexible envelope, and the second clamping portion is attached onto a lower surface of the flexible envelope.

According to a second aspect of the present invention, a flexible-envelope type battery is provided. The flexible-envelope type battery comprises an electrode pair, a flexible envelope and a pair of electrically conductible sealing structures. The electrode pair is enveloped in the flexible envelope and has an anodic collecting electrode and a cathodic collecting electrode. The electrically conductible sealing structures are for acting as an anodic conductive lead and a cathodic conductive lead of the battery respectively. Each sealing structure comprises a conductive terminal and a fixed member. The conductive terminal is for conducting an electric current from the anodic or the cathodic collecting electrode to the outside, and furthermore the conductive terminal comprises a bottom board and a protruding block. The bottom board is disposed within the flexible envelope and combined with the electrode pair. The protruding block is disposed on the bottom board for passing through and protruding from an upper surface of the flexible envelope such that the electric current from the anodic or the cathodic collecting electrode is conducted to the outside via the bottom board and the protruding block. The fixed member is for tightly fixing the flexible envelope and the conductive terminal, and furthermore the fixed member comprises a clamp component. The clamp component has a first clamping portion, a second clamping portion and a bending portion. The bending portion connects the first clamping portion and the second clamping portion so that the first clamping portion is disposed around the protruding block and attached on the upper surface of the flexible envelope, and the second clamping portion is attached onto a lower surface of the flexible envelope.

According to a third aspect of the present invention, an assembling method of a flexible-envelope type battery is provided. The battery comprises an electrode pair and a flexible envelope. The assembling method comprises the following steps: First, the electrode pair is combined with a bottom board of a conductive terminal. The flexible envelope is hot-press sealed to form a flexible envelope having a reserved hole. Then, the electrode pair combined with the conductive terminal is disposed in the flexible envelope so that a protruding block of the conductive terminal passes through and protrudes from an upper surface of the flexible envelope. After that, the flexible envelope and the conductive terminal are fixedly clamped by a clamp component, wherein a first clamping portion of the clamp component is disposed around the protruding block and attached on the upper surface of the flexible envelope, and a second clamping portion of the clamp component is attached onto a lower surface of the flexible envelope. Subsequently, an electrolyte is injected into the flexible envelope via the reserved hole. The flexible envelope is vacuated via the reserved hole. Lastly, the reserved hole is hot-press sealed.

The invention will become apparent from the following detailed description of the preferred but non-limiting embodiment. The following description is made with reference to the accompanying drawings.

DETAILED DESCRIPTION OF THE INVENTION

Figure 1:
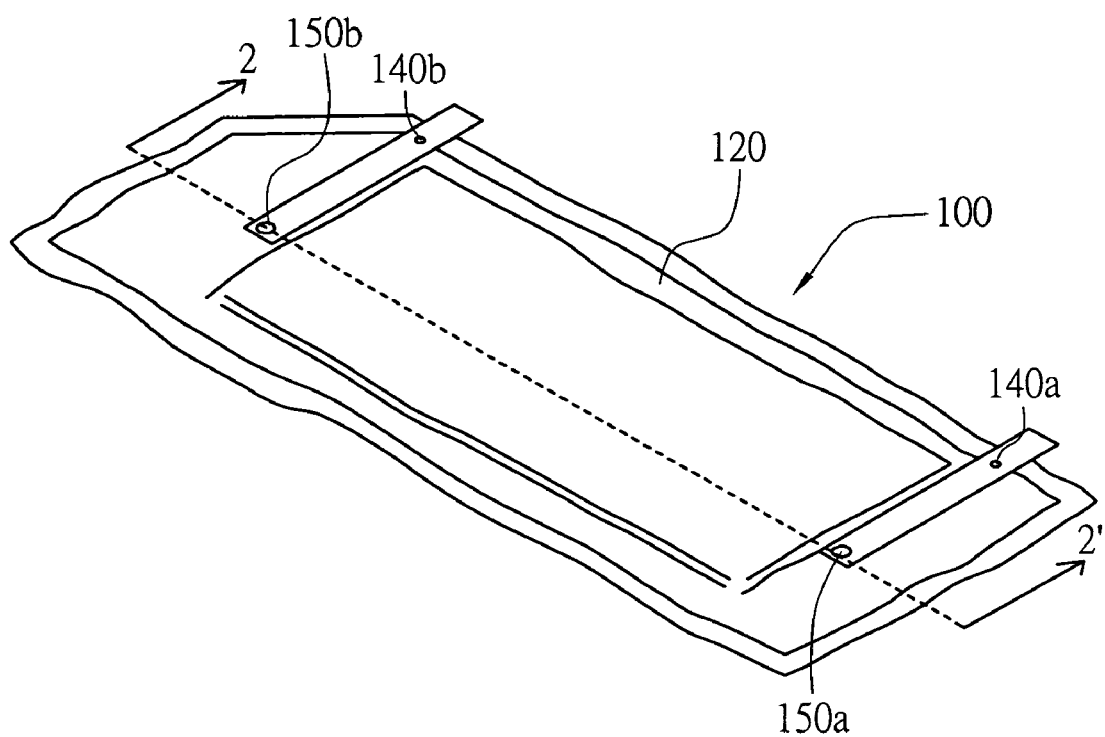
FIG. 1 (Prior Art) is a schematic diagram of a conventional flexible-envelope type battery.
Figure 2:
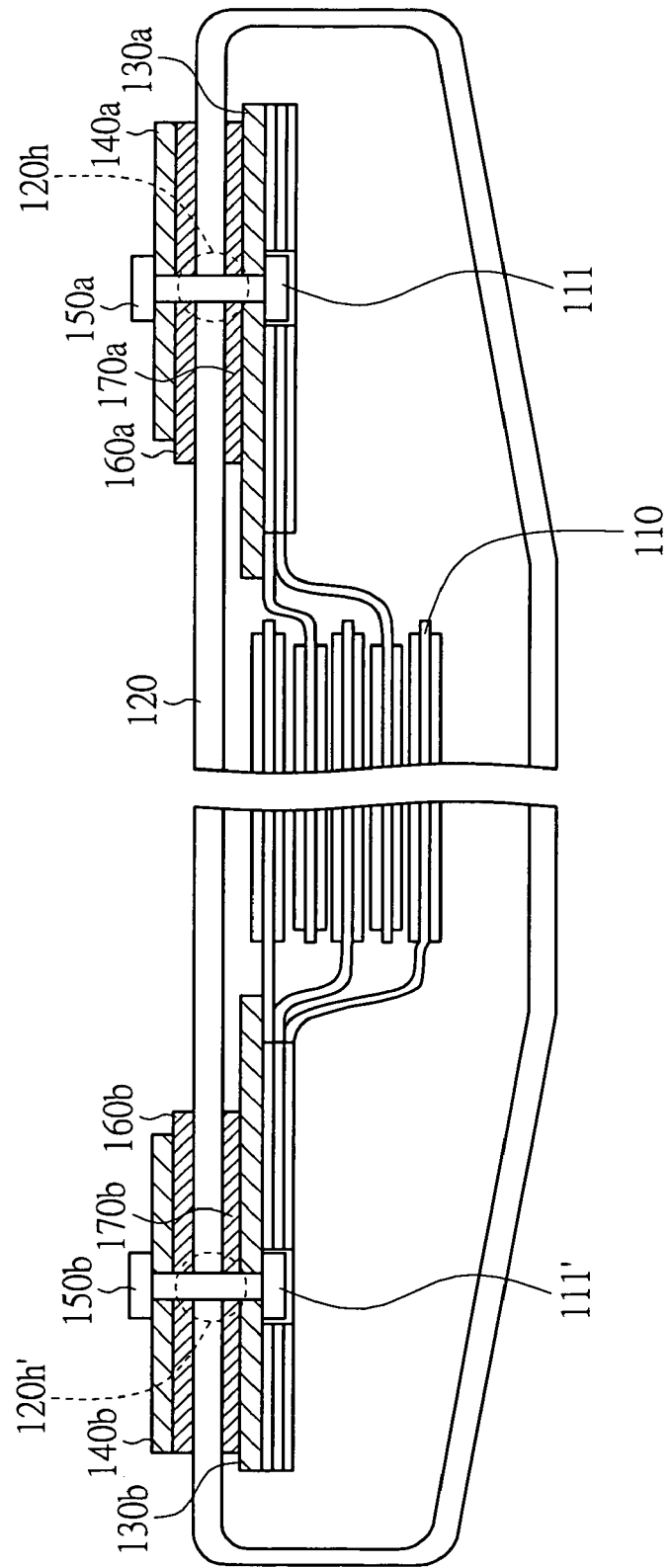
FIG. 2 (Prior Art) is a cross-sectional view at 2-2' line in FIG. 1.
Figure 3:
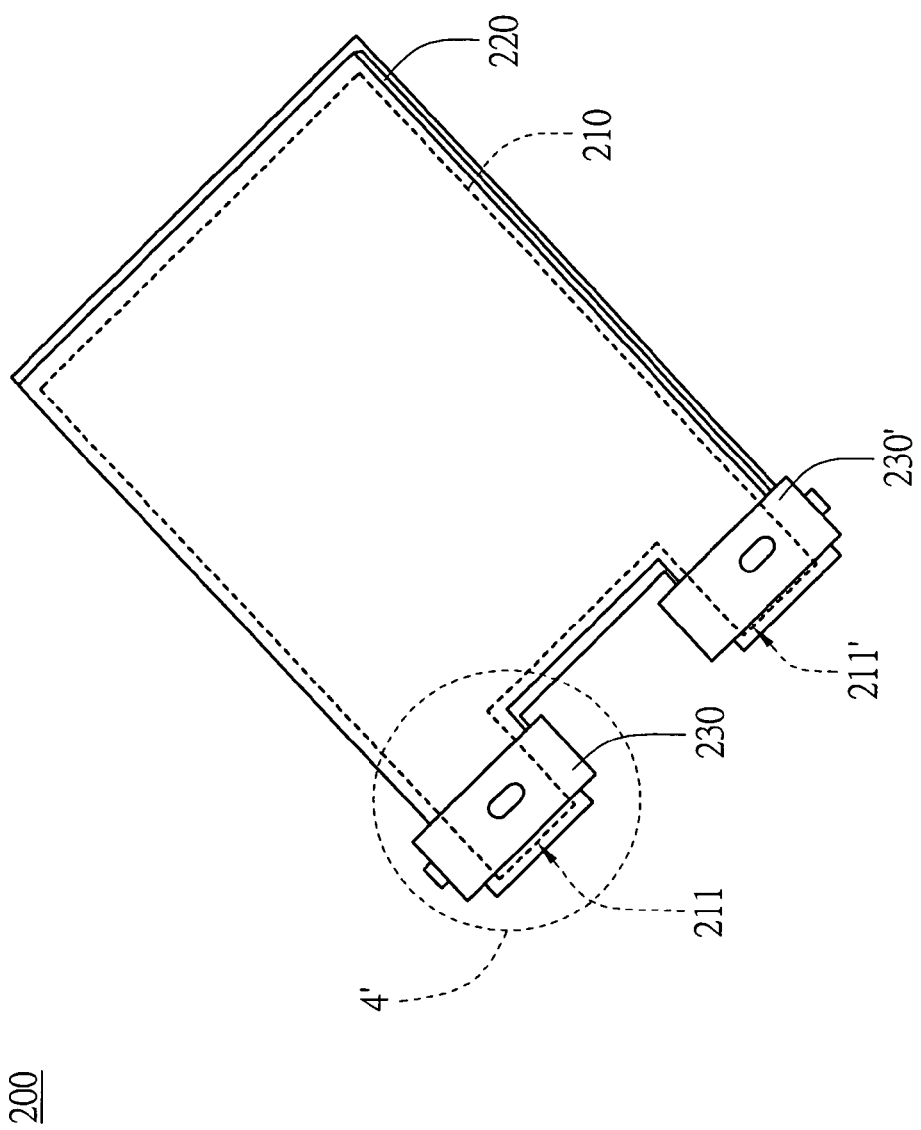
FIG. 3 is a schematic diagram of a flexible-envelope type battery according to a preferred embodiment of the invention.

In embodiments of the present invention, a new electrically conductible structure for conducting an electric current from inside to outside of a battery is provided. Referring to FIG. 3, a schematic diagram of a flexible-envelope type battery according to a preferred embodiment of the invention is shown. As indicated in FIG. 3, the flexible-envelope type battery 200 comprises an electrode pair 210 enveloped in a flexible envelope 220 and a pair of electrically conductible sealing structures 230 and 230'. The electrode pair 210 includes an anodic collecting electrode 211 and a cathodic collecting electrode 211'. And, the sealing structures 230 and 230' is disposed correspondingly to the anodic and the cathodic collecting electrode 211 and 211' respectively for acting as an anodic conductive lead and a cathodic conductive lead of the battery 200 so that the sealing structures 230 and 230' conduct an electric current from the collecting electrodes 211 and 211' to the outside.

The relation between the battery 200 and the sealing structures 230 and 230' will be described hereinafter with reference to the accompanying drawings, FIG. 4 and FIGS. 5a-7c. Because the anode part is similar to the cathode part in the battery 200, the following description will be directed to the anode part, and the description related to the cathode part will be omitted.

Figure 4:
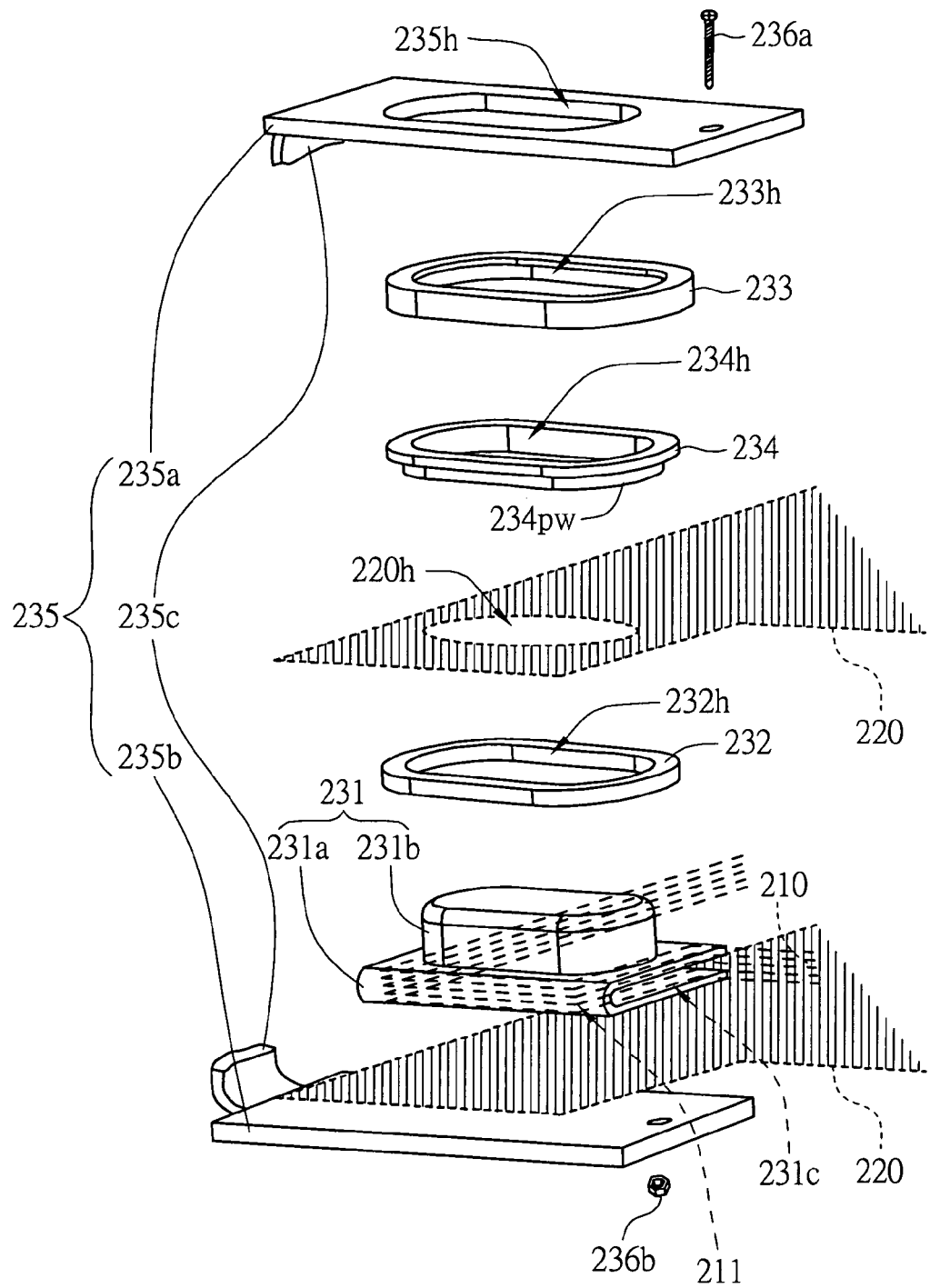
FIG. 4 is an exploded view of the collecting electrode at 4' region in FIG. 3.

Please refer to both FIG. 4 and FIGS. 5a-7c. FIG. 4 is an exploded view of the collecting electrode at 4' region in FIG. 3. FIGS. 5a-7c are schematic diagrams of each element in the electrically conductible sealing structure respectively. As indicated in FIG. 4, the sealing structure 230 includes a conductive terminal 231, a fixed member, an internal sealing gasket 232, an external sealing gasket 233 and an insulation gasket 234. The fixed member includes a clamp component 235 and a fastening component, such as a screw 236a and a screw cap 236b.

Figure 5A:
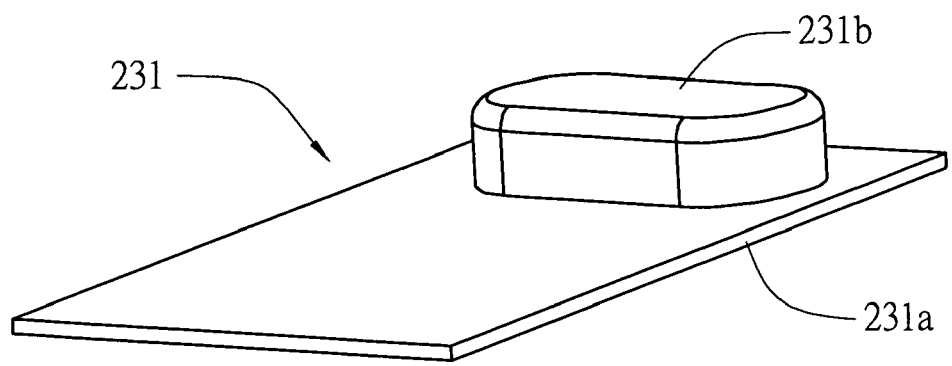
FIGS. 5a-7c are schematic diagrams of each element in the electrically conductible sealing structure respectively.
Figure 5B:
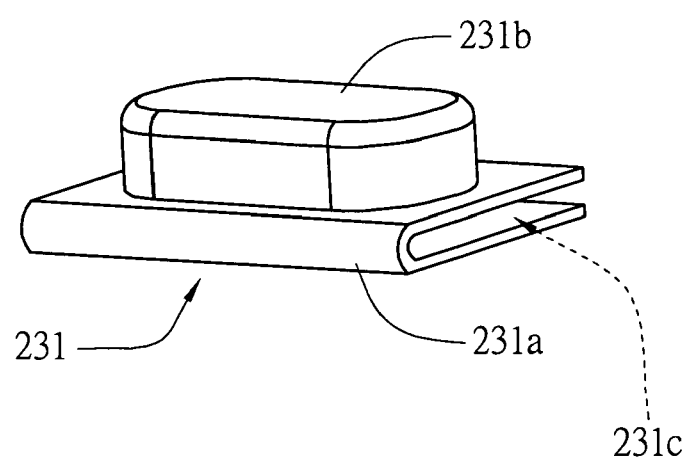

In FIG. 4 and FIGS. 5a-5b, the conductive terminal 231 includes a bottom board 231a and a protruding block 231b. The bottom board 231a is disposed within the flexible envelope 220 and combined with the anodic collecting electrode 211 by clamping. The protruding block 231b is disposed on the bottom board 231a for passing through and protruding from an upper surface of the flexible envelope 220. The bottom board 231a indicated in FIG. 5a can be bent to be a U-shaped bottom board 231a indicated in FIG. 5b. The U-shaped bottom board 231a has an electrodic clamping portion 231c, which is the inner concave surface of the U-shaped bottom board 231a, for clamping the anodic collecting electrode 211 of the electrode pair 210. In the present embodiment, the conductive terminal 231 is preferably made of aluminum or copper depending on applying to an anode or a cathode, but is not limited to. In contrast to the conventional technique, the collecting electrodes are combined with the U-shaped bottom board of the conductive terminal by clamping, not by welding. Therefore, solders and equipments for welding and the process therefor can be omitted in the present embodiment.

But, it should be understood that some collecting electrodes having unusual shape couldn't be clamped into the clamp component 231c indicated in FIG. 5b. In that situation, the conventional welding technique can be used according to one embodiment of the invention, those collecting electrodes also can be directly welded with the unbent bottom board 231a indicated in FIG. 5a.

Figure 6A:
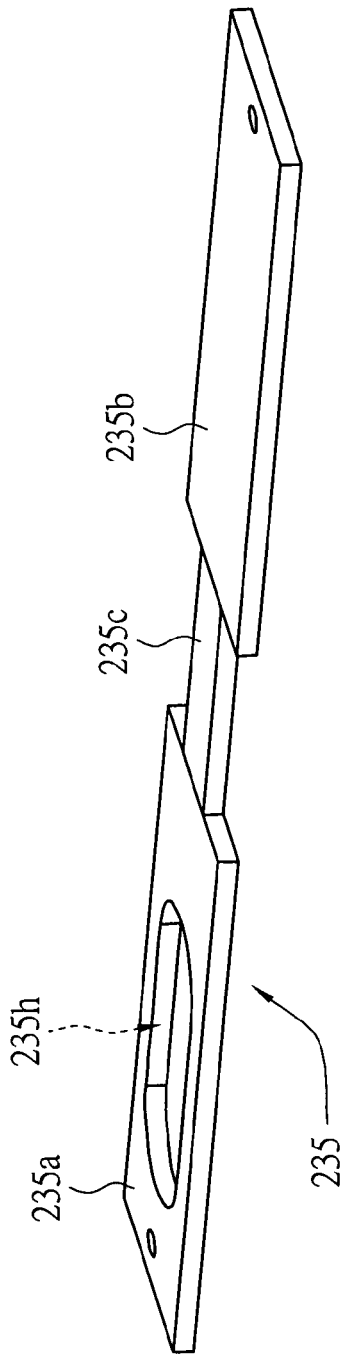
Figure 6B:
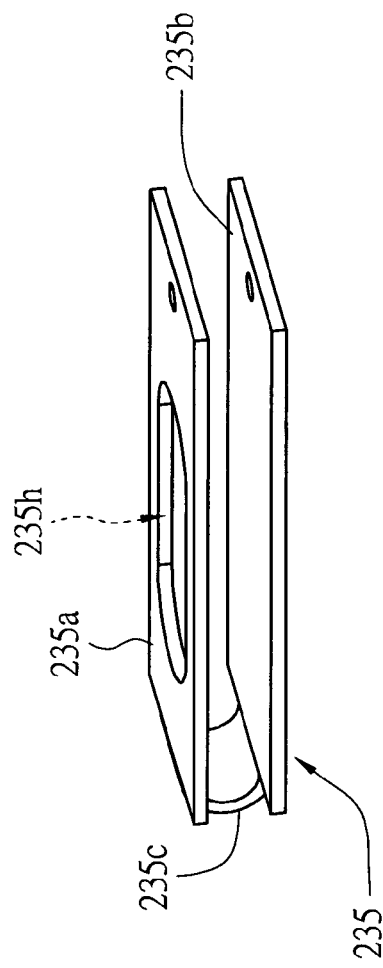
Figure 7A:
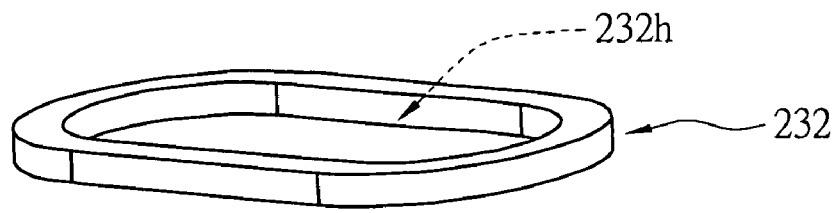
Figure 7B:
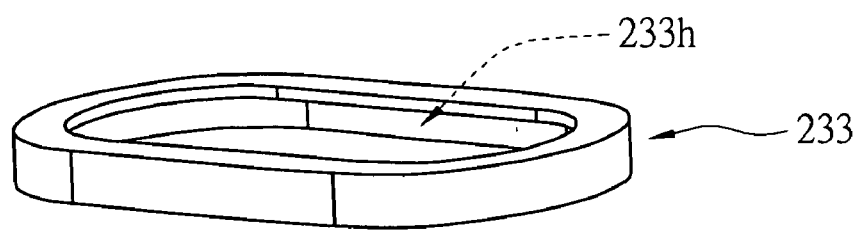
Figure 7C:
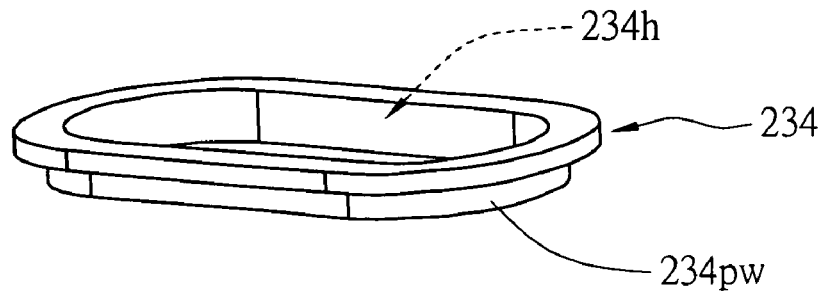

In FIG. 4 and FIGS. 6a-6b, the clamp component 235 has a first clamping portion 235a, a second clamping portion 235b and a bending portion 235c. The bending portion 235c connects the first clamping portion 235a and the second clamping portion 235b. When the bending portion 235c is bent as indicated in FIG. 6b, the clamp component 235 is a U-shaped clamp component 235. The first clamping portion 235a will be disposed around the protruding block 231b and attached on the upper surface of the flexible envelope 220, and the second clamping portion 235b will be attached onto a lower surface of the flexible envelope 220. In the present embodiment, the clamp component 235 is preferably made of aluminum or stainless steel, but is not limited thereto.

In FIG. 4 and FIGS. 7a-7c, the internal sealing gasket 232 is disposed within the flexible envelope 220 and between the flexible envelope 220 and the conductive terminal 231. The external sealing gasket 233 is disposed on the upper surface of the flexible envelope 220 and between the flexible envelope 220 and the clamp component 235. The insulation gasket 234 is disposed on the upper surface of the flexible envelope 220 and between the flexible envelope 220 and the external sealing gasket 233 and wedged into the external sealing gasket 233. In the present embodiment, the internal sealing gasket 232 is preferably made of polymer, but is no limited thereto. The external sealing gasket 233 is preferably made of rigid material such as aluminum or stainless steel, but is no limited to. The insulation gasket 234 is preferably made of electrically isolated material such as insulating polymer, but is no limited thereto.

Besides, the flexible envelope 220 has a penetrating hole 220h disposed correspondingly to the anodic collecting electrode 211. The first clamping portion 235a has a first opening 235h. The internal sealing gasket 232 has a second opening 232h. The external sealing gasket 233 has a third opening 233h. The insulation gasket 234 has a fourth opening 234h. And, the protruding block 231b of the conductive terminal 231 passes through the second opening 232h, the penetrating hole 220h, the fourth opening 234h, the third opening 233h and the first opening 235h sequentially.

In generally, the flexible envelope 220 may include a metallic foil such as an aluminum foil. So, in FIG. 7c, the insulation gasket 234 has a flanged wall 234pw for being embedded into the penetrating hole 220h of the flexible envelope 220 to electrically insulate the metallic foil of the flexible envelope 220 from the protruding block 231b of the conductive terminal 231.

After assembling the elements indicated in FIG. 4, the screw 236a and the screw cap 236b are used for fastening one end of the first clamping portion 235a and one end of the second clamping portion 235b tightly to exert a pressure upon the first clamping portion 235a, the external sealing gasket 233, the insulation gasket 234, the flexible envelope 220, the internal sealing gasket 232, the bottom board 231a and the second clamping portion 235b to form an airtight structure in correspondence with the penetrating hole 220h. And, the electric current from the anodic collecting electrode 211 can be conducted to the outside via the bottom board 231a and the protruding block 231b. In other words, the conductive terminal 231 can be used to conduct the electric current from the anodic collecting electrode 211 to the outside.

Besides, the fixed member is for tightly fixing the flexible envelope 220 and the conductive terminal 231. And, the fastening component of the fixed member, which is the screw 236a and the screw cap 236b indicated in FIG. 4, is merely a kind of fastener for fastening the first and the second clamping portion 235a and 235b. So, it should be understood that the fastening component also can be a rivet, a bolt or a spring clamp for fastening the first and the second clamping portion 235a and 235b in the embodiments of the invention. Additionally, in one embodiment of the invention, the bending portion 235c of the clamp component 235 indicated in FIG. 6a can be cut off while the first clamping portion 235a and the second clamping portion 235b remain. Furthermore, two fastening components will be configured correspondingly to the ends of the clamping portions 235a and 235b respectively for fastening the first and the second clamping portion 235a and 235b tightly, so as to exert a pressure to form an airtight structure in correspondence with the penetrating hole 220h.

Figure 8:
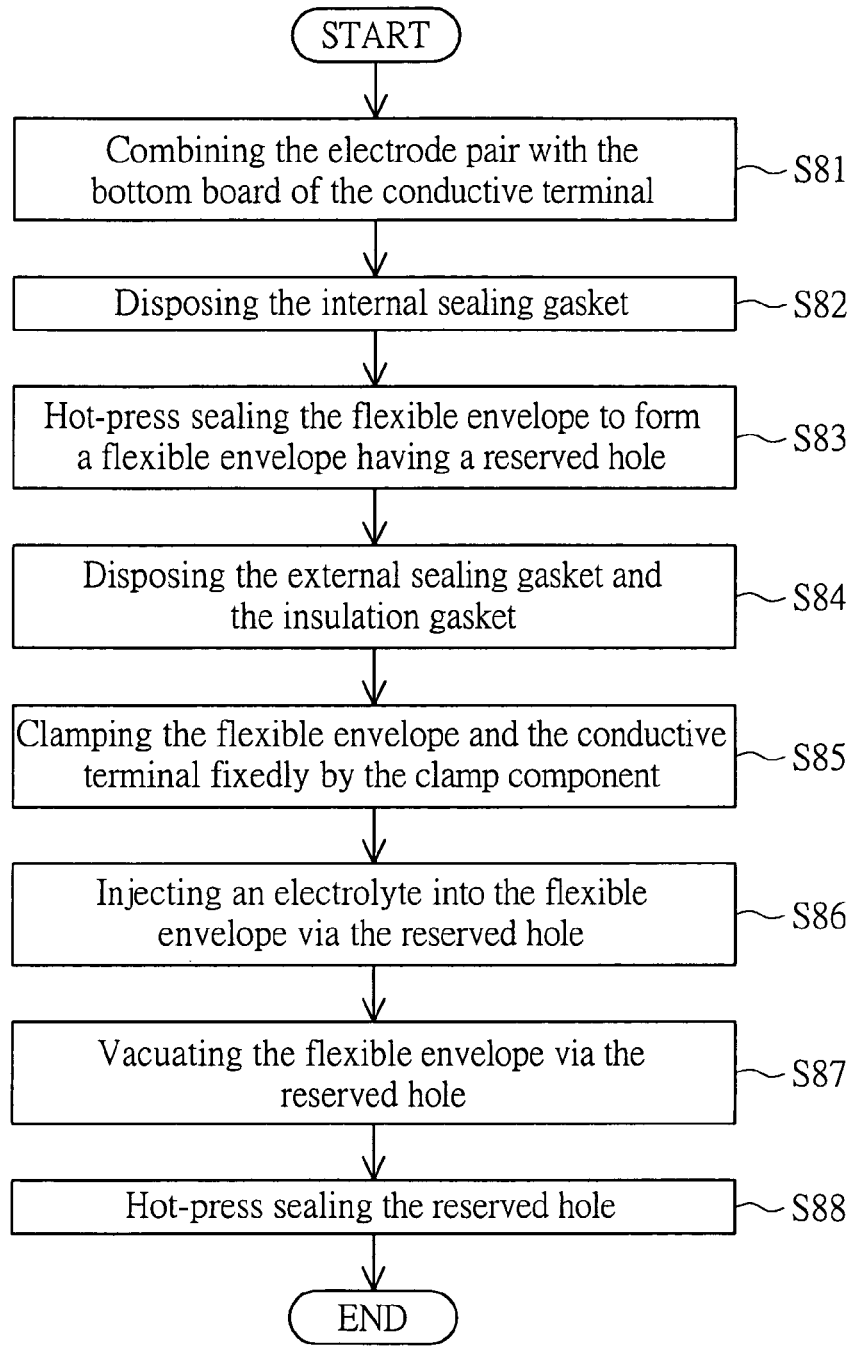
FIG. 8 is a flow chart of an assembling method of the flexible-envelope type battery in FIG. 3.

An assembling method of the flexible-envelope type battery 200 will be described hereinafter with reference to a flow chart. Referring to FIG. 8, the assembling method of the flexible-envelope type battery in FIG. 3 is shown. As indicated in FIG. 8, the assembling method includes the following steps.

First, in step S81, the bottom board 231a of the conductive terminal 231 is combined with the electrode pair 210. As described above, the bottom board 231a is the U-shaped bottom board 231a having the electrodic clamping portion 231c. In step S81, the conductive terminal 231 is combined with the electrode pair 210 by clamping the electrode pair 210 into the electrodic clamping portion 231c.

Then, in step S82, the internal sealing gasket 232 is disposed on the bottom board 231a of the conductive terminal 231 such that the protruding block 231b passes through the second opening 232h.

Next, in step S83, the flexible envelope 220 is hot-press sealed to form a flexible envelope having a reserved hole. As indicated in FIG. 4, the flexible envelope 220 may be distributed into an upper flexible sheet and a lower flexible sheet, and the penetrating hole 220h is disposed at the upper flexible sheet. In step S83, the conductive terminal 231 is disposed between the upper flexible sheet and the low flexible sheet, and the protruding block 231b of the conductive terminal 231 passes through and protrudes from the upper surface of the upper flexible sheet via the penetrating hole 220h, and then the upper flexible sheet and the low flexible sheet are hot-press sealed to form a flexible envelope having a reserved hole (not shown in the drawings).

Afterwards, in step S84, the insulation gasket 234 is wedged into the external sealing gasket 233, and then the external sealing gasket 233 wedged with the insulation gasket 234 is disposed on the upper surface of the flexible envelope 220 such that the protruding block 231b passes through the fourth opening 234h of the insulation gasket 234 and the third opening 233h of the external sealing gasket 233.

Then, in step S85, the flexible envelope 220 and the conductive terminal 231 are clamped fixedly by the clamp component 235. The first clamping portion 235a of the clamp component 235 is disposed around the protruding block 231b and attached on the upper surface of the flexible envelope 220, and a second clamping portion 235b of the clamp component 235 is attached onto a lower surface of the flexible envelope 220. The external sealing gasket 233 wedged with the insulation gasket 234 is disposed between the flexible envelope 220 and the first clamping portion 235a.

Next, in step S86, an electrolyte is injected into the flexible envelope 220 via the reserved hole.

Then, in step S87, the flexible envelope 220 is vacuated via the reserved hole.

Afterwards, in step S88, the reserved hole is hot-press sealed, and the assembling method is finished.

According to the flexible-envelope type battery and the electric conductible sealing structure thereof and the assembling method disclosed in the above embodiment of the invention, a new electrically conductible structure is provided for conducting an electric current from inside to outside of a battery. In the case of conducting the electric current, the electrically conductible structure is a non-screwed and non-riveted structure, so as to effectively reduce the manufacturing processes and decrease the manufacturing equipments. Furthermore, the electrically conductible structure conducts the electric current in direct contact with the electrode pair. Therefore, a larger cross-section area for conducting the electric current over the conventional techniques can be provided. Moreover, the stress corrosion and the jointed seam of a rivet close to the electrolyte and the electrode pair are inexistent, and the electrolyte-leak will be prevented so as to decrease the product defect rate and enhance the market competitiveness.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An assembling method of a flexible-envelope type battery, wherein the battery comprises an electrode pair and a flexible envelope, the assembling method comprising:
   (a) combining the electrode pair with a bottom board of a conductive terminal;
   (b) hot-press sealing the flexible envelope to form a flexible envelope having a reserved hole;
   (c) disposing the electrode pair combined with the conductive terminal in the flexible envelope so that a protruding block of the conductive terminal passes through and protrudes from an upper surface of the flexible envelope;
   (d) clamping the flexible envelope and the conductive terminal fixedly by a clamp component, an internal sealing gasket and an external sealing gasket, wherein a first clamping portion of the clamp component is disposed around the protruding block and attached on the upper surface of the flexible envelope, and a second clamping portion of the clamp component is attached onto a lower surface of the flexible envelope, the first clamping portion has a first opening, wherein the protruding block passes through a second opening of the internal sealing gasket and a third opening of the external sealing gasket and the first opening sequentially to form a sealing structure;
   (e) injecting an electrolyte into the flexible envelope via the reserved hole;
   (f) vacuating the flexible envelope via the reserved hole; and
   (g) hot-press sealing the reserved hole.

2. The assembling method according to claim 1, wherein the step (c) further comprises:
   (c1) disposing the internal sealing gasket within the flexible envelope and between the flexible envelope and the conductive terminal; and
   (c2) disposing the external sealing gasket on the upper surface of the flexible envelope and between the flexible envelope and the first clamping portion of the clamp component.

3. The assembling method to claim 2, wherein the step (c2) further comprises:
   wedging an insulation gasket into the external sealing gasket; and
   disposing the external sealing gasket wedged with the insulation gasket on the upper surface of the flexible envelope.

4. The assembling method according to claim 3, wherein the flexible envelope has a penetrating hole, and the insulation gasket has a fourth opening, and the step (c) further comprises: allowing the protruding block of the conductive terminal to pass through the second opening, the penetrating hole, the fourth opening, the third opening and the first opening sequentially.

5. The assembling method according to claim 4, wherein the flexible envelope has a metallic foil, and the insulation gasket has a flanged wall, the step (c2) further comprising:
   embedding the flanged wall into the penetrating hole of the flexible envelope to electrically insulate the metallic foil of the flexible envelope from the protruding block of the conductive terminal.

6. The assembling method according to claim 1, wherein the bottom board is a U-shaped bottom board having an electrodic clamping portion, the step (a) further comprising:
   clamping the electrode pair into the electrodic clamping portion to combine the U-shaped bottom board with the electrode pair.

7. The assembling method according to claim 1, wherein the step (a) further comprises:
   welding the electrode pair with the bottom board of the conductive terminal.

8. The assembling method according to claim 1, wherein the step (d) further comprises:
   fastening the first clamping portion and the second clamping portion by a fastening component.

* * * * *